Aug. 4, 1931.                N. J. POUX                1,817,840
                          SEPARABLE FASTENER
                         Filed Sept. 30, 1929
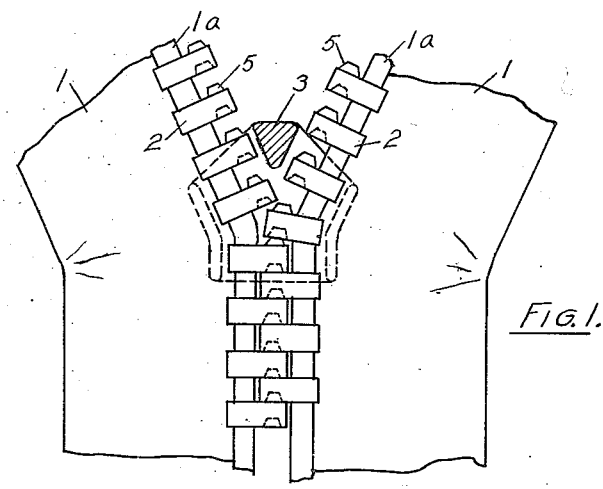
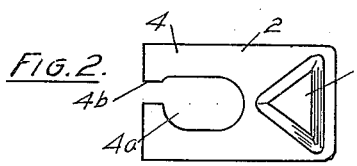 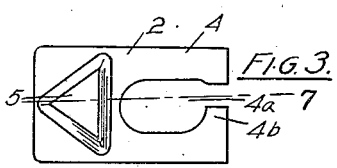 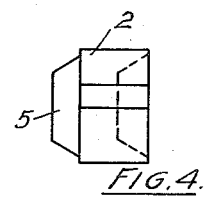
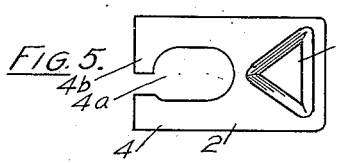 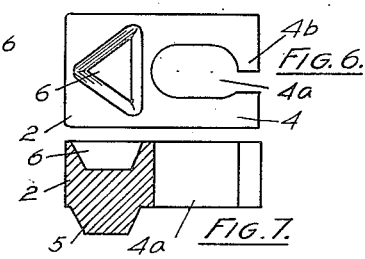 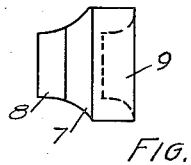
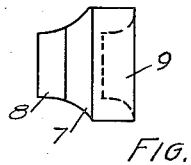
Noel J. Poux
INVENTOR.
BY
ATTORNEYS.

Patented Aug. 4, 1931

1,817,840

UNITED STATES PATENT OFFICE

NOEL J. POUX, OF MEADVILLE, PENNSYLVANIA, ASSIGNOR TO LION FASTENER INC., OF MEADVILLE, PENNSYLVANIA, A CORPORATION OF DELAWARE

SEPARABLE FASTENER

Application filed September 30, 1929. Serial No. 396,179.

Separable fasteners involving a series of interlocking members adapted to be swung into interlocking position are usually insecure if the series of members are swung relatively to each other to a very great extent out of a common plane. The present invention is designed to provide interlocking surfaces which will tend to prevent undue flexing from the common plane so that the engagement may be more certainly maintained. In carrying out this feature of the invention the members in the opposite series are differently formed in a manner that might be described as rights and lefts. It is further desirable in many instances to shift the central line of the fastening members with regard to the stringers on which they are attached. The present invention contemplates such a structure. Features and details of the invention will appear from the specification and claims.

A preferred embodiment of the invention is illustrated in the accompanying drawings as follows:—

Fig. 1 shows an elevation of the fastener.

Fig. 2 a plan view of one of the interlocking members.

Fig. 3 a similar view of an interlocking member of the opposing series.

Fig. 4 an end view of the structure shown in Fig. 3.

Fig. 5 a plan view of the reverse side of the member shown in Fig. 2.

Fig. 6 a plan view of the reverse side of the member shown in Fig. 3.

Fig. 7 a sectional view taken on the line 7—7 in Fig. 3.

Fig. 8 an elevation of the interlocking members in engagement.

Fig. 9 an end view of a modification.

1 marks the stringers, 1a ribs along the edges of the stringers, 2 interlocking members secured to the stringers along the ribs and 3 the slider for actuating the members to separate and close them.

The interlocking members are provided with jaws 4 having each the recess 4a to receive the rib and the inwardly projecting ends 4b to close back of the rib. The projections 4b are of different dimensions so that the plane of the stringer as defined by the space between the projections 4b may be off-set as desired relatively to the plane through the centers of the interlocking members. The interlocking members are provided with projections 5 and recesses 6 on the reverse sides, the recesses registering with the projections. These projections are three-sided and preferably of true triangular form. The recesses of the members of one series are adapted to receive the projections of the opposing series. In order to accomplish this the side of the projection as to one series is parallel to and adjacent to the free end of the member while in the opposing series the parallel side of the projection is remote from the end of the member and the recesses are similarly arranged and the members of the two series are not, therefore, interchangeable, and may be said to be oppositely disposed with relation to the free ends of the members.

By utilizing a three-sided projection the sides of which are adapted to engage the sides of the walls of a three-sided recess, the projections may be more definitely locked against swinging relatively to each other than with structures more nearly round, and this locking action may be accomplished with a looser fit than polygonal structures having more sides. Some looseness is desirable to facilitate the swinging of the members into and out of engagement as they are acted upon by the slider. It is also desirable to incline the sides of the projections and the sides of the recesses for the same reason.

In Fig. 9 I have shown an alternative construction in which the member 7 has a projection 8 extending farther from the face of the member than the structures of Fig. 1.

This permits of a greater separation between the members and in some respects is more desirable. The projections extend into recesses 9, the projections and recesses being preferably three-sided.

What I claim as new is:—

1. A separable fastener comprising opposing series of interlocking members adapted to be swung into interlocking position, each member having a three-sided projection on one face and a three-sided recess on the opposite face, the recesses being adapted to receive the projections, the three side walls of the projections confronting the three side walls of the recesses receiving the projections.

2. A separable fastener comprising opposing series of interlocking members adapted to be swung into interlocking position, each member having a three-sided projection on one face and a three-sided recess on the opposite face, the recesses being adapted to receive the projections, the recess and the projection on the reverse sides of each member being in register, the three side walls of the projections confronting the three side walls of the recesses receiving the projections.

3. A separable fastener comprising opposing series of interlocking members adapted to be swung into interlocking position, each member having a three-sided projection on one face and a three-sided recess on the opposite face, the recesses being adapted to receive the projections with the three side walls of each projection confronting the three side walls of the recess receiving the projection, the recess and the projection on the reverse sides of each member being in register, the members in one series having their projections and recesses oppositely disposed to those of the other series with relation to the free ends of the members.

4. A separable fastener comprising opposing series of interlocking members adapted to be swung into interlocking position, each member having a three-sided projection on one face and a three-sided recess on the opposite face, the recesses being adapted to receive the projections with the three side walls of each projection in engagement with the three side walls of the recess receiving the projection, the side walls of the projections and recesses being inclined to the face of the member.

5. A separable fastener comprising opposing series of interlocking members adapted to be swung into interlocking position, each member having a three-sided projection having a triangularly shaped top on one face of the member and a three-sided recess on the opposite face of the member, the recesses being adapted to receive the projections and the three side walls of the projections confronting the three side walls of the recesses receiving the projections.

6. A separable fastener comprising stringers; and interlocking members secured to the stringers, the interlocking members projecting from the edges of the stringers and the free part of each stringer being off-set relatively to the edges of its interlocking members, said interlocking members having jaws clamping the edges of the stringers, said jaws having inward projections, the projections at one side of the stringer being greater than at the other side thereof.

In testimony whereof I have hereunto set my hand.

NOEL J. POUX.